United States Patent [19]

Caspar et al.

[11] 4,104,924
[45] Aug. 8, 1978

[54] PRESSURE DIFFERENCE MEASURING APPARATUS

[75] Inventors: Heinz Caspar; Felix Kudritzki; Horst Ziegler, all of Berlin, Fed. Rep. of Germany

[73] Assignee: Siemens Aktiengesellschaft, Munich, Fed. Rep. of Germany

[21] Appl. No.: 796,718

[22] Filed: May 13, 1977

[30] Foreign Application Priority Data

May 26, 1976 [DE] Fed. Rep. of Germany ....... 2623993

[51] Int. Cl.² .............................................. G01L 7/08
[52] U.S. Cl. .................................................. 73/716
[58] Field of Search ................. 73/407 R, 406, 398 R, 73/410, 405

[56] References Cited

U.S. PATENT DOCUMENTS

| 3,324,727 | 6/1967 | Smith et al. | 73/407 R |
| 3,485,104 | 12/1969 | Sanford | 73/407 R |
| 3,795,140 | 3/1974 | Nishihara | 73/407 R |

Primary Examiner—Donald O. Woodiel
Attorney, Agent, or Firm—Kenyon & Kenyon, Reilly, Carr & Chapin

[57] ABSTRACT

A pressure differential measuring apparatus comprising a cylindrical member having a first portion and a second portion of reduced diameter relative to the first portion. The first portion is provided with an outwardly extending member, while the second portion serves as a control rod. The instrument is further provided with a resilient bendable tubular member which surrounds the second portion and is connected to the outwardly extending member of the first portion by a circular electron-beam-welded seam.

1 Claim, 1 Drawing Figure

U.S. Patent
Aug. 8, 1978
4,104,924
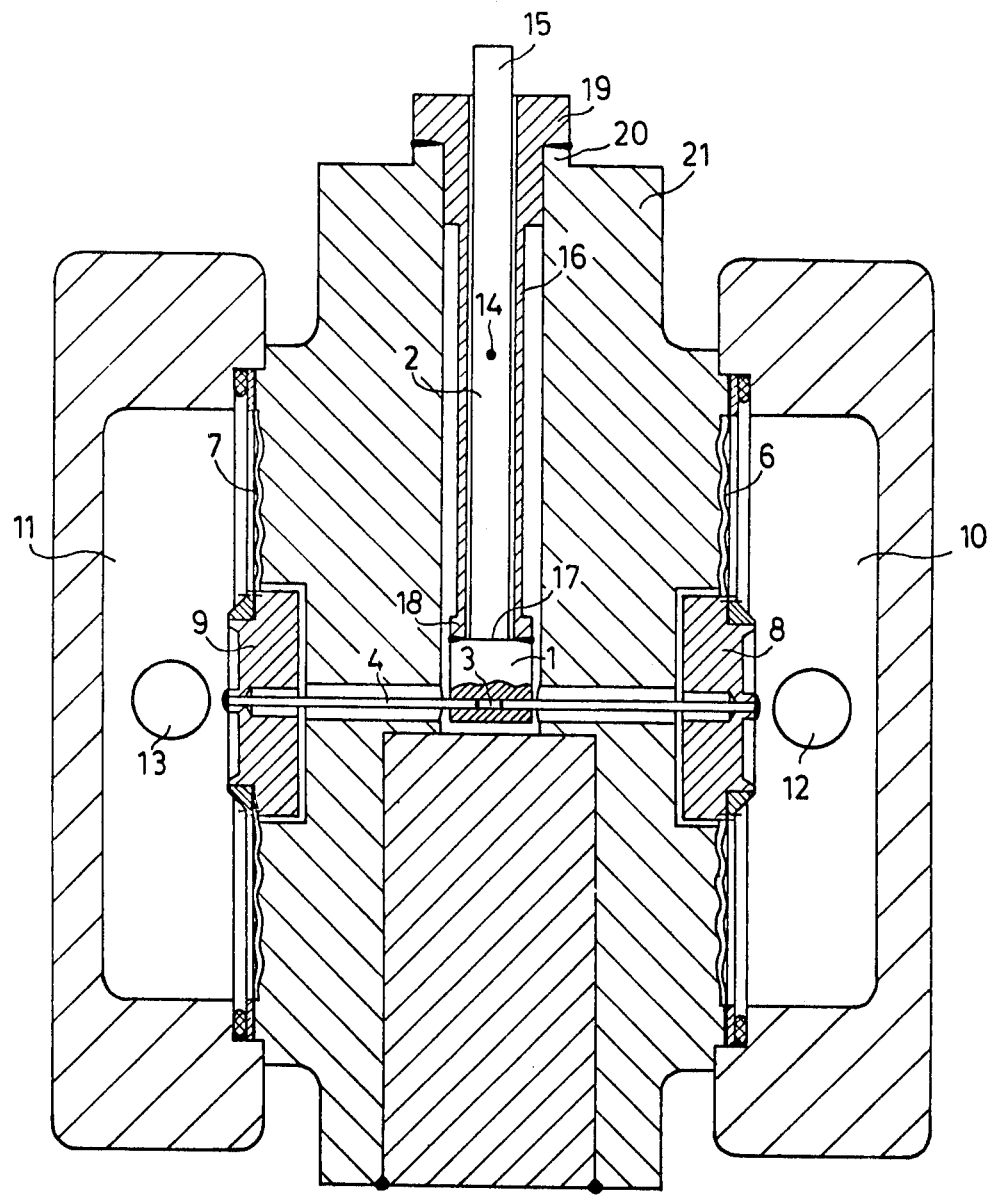

PRESSURE DIFFERENCE MEASURING APPARATUS

BACKGROUND OF THE INVENTION

1. Field of the Invention

The invention relates to a pressure differential measuring apparatus wherein a resilient bendable tubular member acting as a measuring spring surrounds a control rod which is firmly connected to one end of the tubular member.

2. Description of the Prior Art

In one known pressure differential measuring apparatus of the above type, the resilient tubular member serves at the same time as a feedthrough for coupling the measured differential pressure from the measuring chamber of the measuring apparatus. This simplifies the design of the measuring apparatus and facilitates production. However, the aforesaid type of measuring apparatus is not able to be constructed with a minimum degree of compactness. This is due to the fact that such a construction of the apparatus requires that the gap between the control rod and the interior surfaces of the tubular member be maintained at a few tenths of a millimeter over the relatively great length of the rod.

It is therefore an object of the present invention to provide an improved pressure differential measuring apparatus of the above type.

SUMMARY OF THE INVENTION

In accordance with the principles of the present invention, the above and other objectives are accomplished in a measuring apparatus comprising a cylindrical member having a first portion provided with an outwardly extending member, and a second portion of reduced diameter serving as a control rod. The apparatus is further provided with a resilient bendable tubular member which surrounds the second portion of the cylindrical member and is attached to the outwardly extending member of the first portion by means of a circular election-beam-welded seam.

Thus, with the present measuring apparatus, the cylindrical member whose second portion serves as the control rod of the apparatus and the resilient tubular member are first manufactured separately, where required tolerances can be maintained without appreciable difficulty. Thereupon, the tubular member is pushed over the second portion of the cylindrical member and fastened to the outwardly extending member of the first portion of the cylindrical member by means of a circular electron-beam weld. Hence, the measuring apparatus of the invention is relatively simple to manufacture.

The measuring apparatus is further advantageous in that through the use of well known electron-beam welding process (see, for example the book by J. Ruge "Handbuch der Schweisstechnik" (Welding Handbook), 1974, pages 268 to 271), a very strong mechanical connection between the tubular member and the cylindrical member can be achieved. This is of particular importance in a pressure differential measuring apparatus, because of high degree of static pressure and a large bending moment are exerted on the tubular member and the second section of the cylindrical member, which could cause dislocation of the section if the joint between the tubular member and the outwardly extending member of the first portion is not substantially perfect. As the position of the second section forming the control rod provides the indication of the pressure difference being measured, an insufficient fastening will result in an incorrect indication of the pressure difference.

BRIEF DESCRIPTION OF THE DRAWING

The above and other features and aspects of the present invention will become more apparent upon reading the following detailed description in conjunction with the accompanying drawing wherein a sole FIGURE illustrates a measuring apparatus in accordance with the principles of the present invention.

DETAILED DESCRIPTION

The measuring apparatus of the invention comprises a cylindrical member 1 having a lower portion and an upper portion of reduced diameter which forms a control rod 2. At the end of the lower portion facing away from the control rod 2, the cylindrical member is provided with a hole or bore 3, into which extend from opposite ends rod-like connecting members 4 and 5. The latter members are fastened in the bore 3 by welding or other means. The other ends of the connecting members 4 and 5 are mechanically connected to respective measuring elements 6 and 7, shown as diaphragms, via central diaphragm members 8 and 9. The measuring elements 6 and 7 are acted upon by different pressures which are coupled into measuring chambers 10 and 11 via openings 12 and 13. The cylindrical member 1 and, thereby, the control rod 2, are therefore, rotated by the connecting members 4 and 5 about a fictitious fulcrum 14, so that the upper end 15 of the control rod 2 is swung or rotated through a distance which corresponds to the respective pressure difference.

The measuring apparatus further includes a measuring spring formed by a resilient bendable tubular member 16. The latter member surrounds the rod 2 and is attached to an outwardly extending member or step 17 located on the lower portion of the cylindrical member 1 by means of a circular electron-beam weld 18.

The tubular member 16, which serves at the same time for coupling the measurment value from the pressure differential measuring apparatus, carries at its upper end a circular flange 19, with which it is welded to a collar 20 of the flange part 21 of the housing 22 of the measuring apparatus. The latter connection also is advantageously made by electron-beam welding.

With the apparatus of the present invention constructed as aforesaid, the apparatus may be designed for minimum compactness, as the tubular member 16 and the control rod 2 may be first manufactured by themselves and then joined together by electron-beam welding.

It should be pointed out that the pressure differential measuring instrument of the invention may be an instrument by which the pressure against vacuum (absolute pressure) or the atmospheric pressure can be measured.

What is claimed is:

1. A pressure differential measuring apparatus comprising:
   a cylindrical member comprising first and second portions, said second portion serving as a control rod and being of reduced diameter relative to said first portion so that that said first portion includes a surface portion which extends outwardly from said second portion;
   and a resilient bendable tubular member extending upwardly from said surface portion of said first portion in surrounding relationship to said second portion, said tubular member being connected to said first portion at said surface portion by a circular electron-beam-welded seam.

* * * * *